Patented Feb. 23, 1943

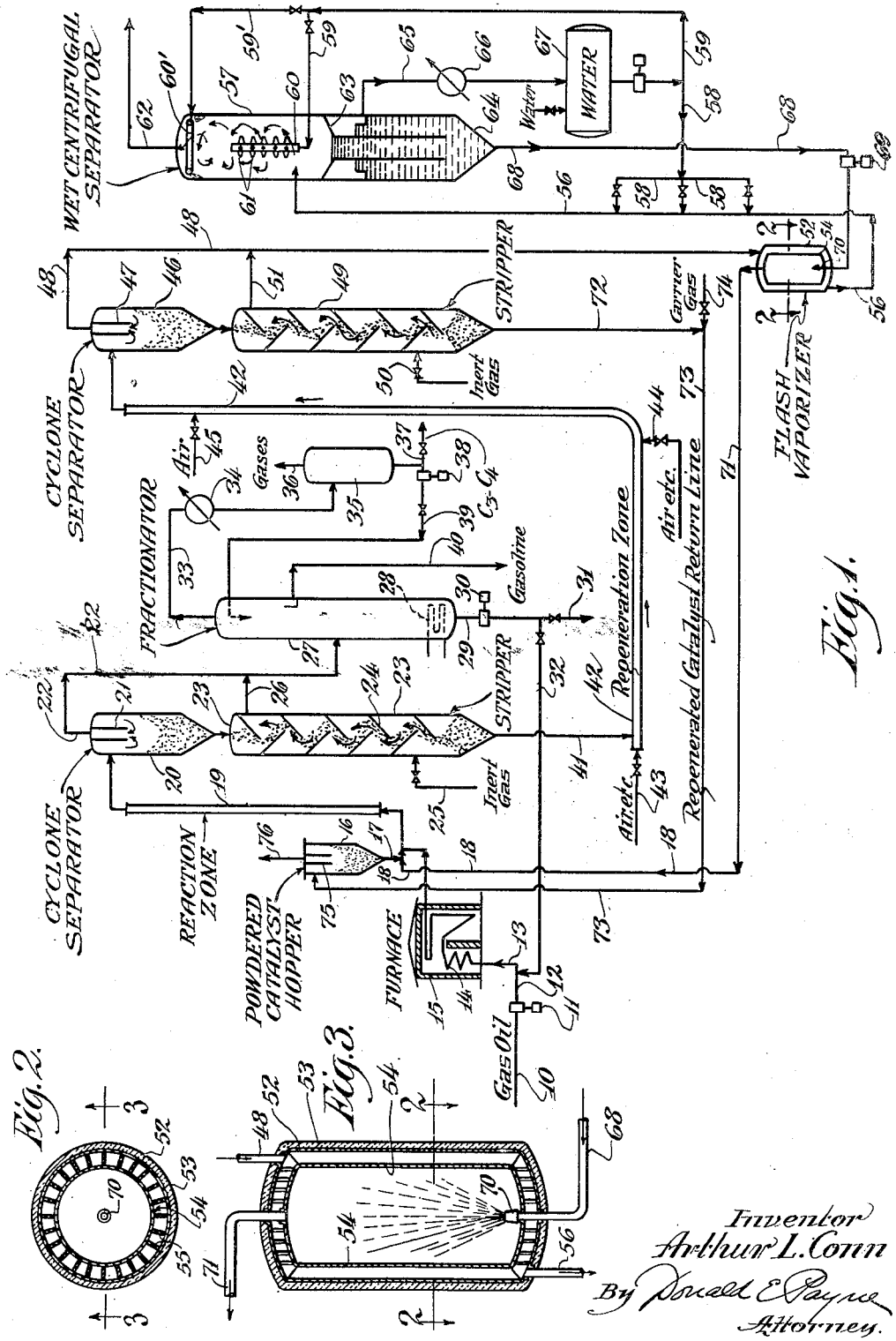

2,311,978

UNITED STATES PATENT OFFICE 2,311,978

POWDERED CATALYST RECOVERY

Arthur L. Conn, Chicago, Ill., assignor to Standard Oil Company, Chicago, Ill., a corporation of Indiana Application June 29, 1940, Serial No. 343,086

7 Claims. (Cl. 196—52)

This invention relates to catalyst recovery and it pertains more particularly to the removal of powdered catalyst from vapor streams and the subsequent suspension of recovered catalyst in hot gaseous or vapor streams. While the invention is primarily directed to hydrocarbon conversion processes it is applicable to any process wherein it is desired to remove the last traces of finely divided solids from a gaseous stream and then to disperse said removed solids in another gaseous stream.

Many hydrocarbon conversion processes, such as catalytic cracking, catalytic reforming, catalytic isomerization, etc., employ powdered catalyst which is contacted with hydrocarbon vapors at high temperatures in a reaction zone, then separated from the hydrocarbon vapors, regenerated and returned to the contacting step. In such processes considerable trouble has been experienced in removing particles of catalyst from the hot hydrocarbon vapor streams and from the regeneration gases respectively. Most of the catalyst, about 95 to 99.9% can be separated from the gaseous or vapor stream by centrifugal separation in so-called cyclone separators. However, the small amount of catalyst usually carried with gases and vapors leaving such separators is a matter of great importance in commercial systems because such losses amount to many tons of catalyst per day. The catalyst which is thus carried with hydrocarbon reaction products may be recovered in heavy liquid products in a subsequent fractionation step. The catalyst which is not removed from regeneration gases has been for the most part entirely lost. It has been proposed to employ electrical precipitation for the recovery of catalyst from regeneration gases but this system is expensive and is objectionable for many reasons. An object of my invention is to provide a new and improved method and means for recovering spent and regenerated catalyst and for reintroducing the recovered catalyst into a recovery or conversion system respectively.

It has been proposed to separate the powdered catalyst from a water scrubbing liquid, filter the water from the recovered catalyst and then return the catalyst to the system but such processes have not met with commercial success. It is practically impossible to filter the extremely finely divided catalyst particles from aqueous solution and when the water slurry of the catalyst is dried it agglomerates to form a pasty mud and it, therefore, is necessary to subject this dried catalyst to a grinding operation in order to produce the requisite fineness for redispersion into a gaseous medium. An object of my invention is to provide an improved method of handling aqueous catalyst slurries whereby the catalyst particles cannot agglomerate and wherein they are directly dispersed in steam which is generated from the water with which they are associated. In other words, I propose to pass directly from the aqueous slurry stage to the suspended-powdered-catalyst-in-steam stage without any intermediate drying step and without permitting catalyst to deposit on metal surfaces.

A further object of the invention is to provide improved method and means for utilizing the heat of hot regeneration gases for vaporizing fluids charged to a catalyst conversion system and for simultaneously effecting the suspension of powdered catalyst in said vaporized fluids.

A further object of the invention is to provide improved means for effecting a wet centrifugal separation of finely divided catalyst from a gaseous stream in which it is suspended. Other objects will become apparent as the detailed description of my invention proceeds.

In practicing the invention I introduce water into into the hot gaseous stream which contains the powdered catalyst to cool the gaseous stream and to cause the formation of a fog or mist therein which will wet the finely divided catalyst particles and so increase their weight that they may be separated by centrifugal means. The hot regeneration gases first pass through a specially designed vaporizer in order to utilize the high temperature heat thereof and they are then passed to a centrifugal separation zone. Gases leaving the vaporizer are cooled by the direct injection of water into the gaseous stream either before said stream reaches the separation zone or while the gases are being swirled in said zone. The amount of water should be such that its vaporization will cool the gases to a temperature to or below the boiling point of water and so that a fog or mist will be introduced or formed in the centrifugal separation zone. The velocity of flow in the separation zone should be sufficient to effect the removal of all liquids and solids from the regeneration gases. The catalyst may be concentrated in the separated water by sedimentation and the concentrated catalyst slurry is then passed through my new and improved vaporizer which is preferably heated by the hot regeneration gases and which serves to convert the water in the slurry into steam without permitting catalyst agglomeration.

The preferred embodiment of my slurry vaporizer is a closed cylindrical vessel which is maintained at a temperature of about 800 to 1000° F. by a jacket of hot regeneration gases. The aqueous catalyst slurry is injected or atomized in a fine stream, preferably at the base of this vessel, and the water content of the slurry is completely converted into steam before it has an opportunity to contact any surface. The gases adjacent the inner surface of this vessel are so highly superheated that they cause the vaporization of the introduced liquid immediately on its introduction into the vessel and while it is suspended in the central part thereof. This generated steam carries with it in suspension the powdered catalyst which was theretofore present in the slurry and the generated steam acts as a pneumatic conveying means for returning this catalyst to the conversion step of the process.

The invention will be more fully understood from the following detailed description of a preferred embodiment and from the accompanying drawing wherein similar parts are designated by like reference characters in the several figures.

Figure 1 is a diagrammatic flow sheet of my improved catalyst conversion process illustrating a vertical section through my catalyst recovery and resuspension means.

Figure 2 is a horizontal section taken along the lines 2—2 of Figures 1 and 3 and Figure 3 is a vertical section taken along the line 3—3 of Figure 2.

While the invention is applicable to any hydrocarbon conversion process which employs powdered catalyst, I will describe as a preferred embodiment the application of a powdered catalyst to a catalytic cracking process for the conversion of gas oil into high quality motor fuel. Gas oil from line 10 is forced by pump 11 through lines 12 and 13 to coils 14 of pipe still furnace 15. Powdered catalyst from hopper 16 is introduced through line 17 into the discharge line of coils 14 by means of a steam injector using steam from line 18 although other feeder mechanisms may be used. The gas oil is preferably heated to a temperature of about 800 to 1050° F. under a pressure which may range from atmospheric to 50 pounds or higher and under these temperatures and pressures the hot vapors carry the powdered catalyst through reaction zone 19 which is so designed as to give a time of contact of about 1 to 50 seconds or more. Usually about 0.2 to 20 pounds of powdered catalyst are employed per pound of liquid gas oil charging stock.

The reaction vapors together with the suspended catalyst material are tangentially introduced into one or more cyclone separators 20 which are provided with a central cylindrical baffle 21 through which hydrocarbon vapors are removed by means of line 22. The separated catalyst, usually about 95 to 99.9% thereof, is withdrawn from the bottom of separator 20 into catalyst stripper 23 which is provided with inclined baffles 24. A stripping gas which may be steam or a hot normally gaseous hydrocarbon is introduced through line 25 and passed upwardly in the stripper at too low a velocity to interfere with the downward passage of the catalyst. Stripper gas is removed from the stripper through line 26 to line 22 and the reaction products together with the stripper gas are introduced into fractionating column 27 which is provided with a suitable reboiler 28 at its base. Heavier-than-gasoline hydrocarbons are withdrawn from the column through line 29 and are delivered by pump 30 either through line 31 to storage or to some other conversion process or through line 32 and line 13 for further conversion in the cracking process.

Normally gaseous hydrocarbons are taken overhead from column 27 through line 33 and cooler 34 and are then introduced into receiver 35 from which separated gases are vented through line 36. A part of the condensed liquids from receiver 35 may be withdrawn from the system through line 37 and the remainder recycled by means of pump 38 through line 39 and serve as reflux in the top of tower 27. Gasoline may be withdrawn as a side cut through line 40 or it may be taken overhead to a stabilizer. It will be understood of course that any other fractionating system may be employed.

Stripped catalyst from the base of catalyst stripper 23 is pumped by a pressure feeder such as a Fuller-Kenyon screw pump through line 41 to regeneration conduit 42 into which regeneration gases which preferably include regulated amounts of air are introduced through lines 43, 44 and 45. The regeneration gases act as pneumatic conveying means for carrying the powdered catalyst through the regeneration zone and the amount of introduced oxygen is regulated in order to prevent regeneration temperatures exceeding 1050 to 1100° F. External cooling, stage cooling, excess flue gas circulation, etc., may be employed to keep the regeneration temperature within safe limits.

The hot regeneration gases and regenerated catalyst are then introduced into cyclone separator 46 which is provided with a central cylindrical baffle 47 through which regeneration gases are withdrawn by means of line 48. Regenerated catalyst then passes through stripping column 49, a suitable stripping gas such as steam or flue gas being introduced through line 50 and withdrawn through line 51 which discharges into line 48.

The gases in line 48 may contain from .1% to about 5% of the total catalyst which is being circulated and it is, therefore, essential that this catalyst be recovered. Usually the catalyst is an activated hydrosilicate of alumina which may be prepared by activating bentonite or other suitable clays or which may be prepared by depositing metal oxides on silica gel. The invention is not limited however to any particular type of catalyst since all catalysts are so expensive that it is desired to avoid catalyst losses or at least to keep those catalyst losses to less than $\frac{1}{10}$ of 1%.

The hot regeneration gases with the remaining catalyst particles in suspension are first passed through the outer jacket 52 of my improved flash vaporization system. This system is more clearly illustrated in Figures 2 and 3 from which it will be seen that the outer surfaces of cylindrical jacket 52 is heavily insulated by insulation material 53. The inner vaporizing vessel 54 is spaced from vessel 52 to provide a jacket for the flow of hot regeneration gases in the annular space therebetween. A plurality of radial fins 55 extend from vessel 54 to inner walls of chamber 52, thus forming a plurality of vertical conduits through which the hot regeneration gases may pass. These fins not only give structural support to the apparatus but they serve as important heat transfer means for picking up heat from the hot regeneration gases and conducting said heat to vessel 54.

After flowing through the annular space between vessel 54 and chamber 52, the hot regeneration gases pass by line 56 to the lower part of the centrifugal separation zone in tower 57. The gases may be further cooled in line 56 by the injection of water from line 58, the amount of water preferably being such that its vaporization will lower the temperature of the gases to about 200–212° F., i. e., to a temperature at which steam begins to condense. The condensation of steam in line 56 may be effected by further cooling this line or by injecting further amounts of water along the line. I prefer to so introduce this water that a fine mist will be obtained of which the droplets either build up on the catalyst particles as a nucleus or which wet or absorb the catalyst particles or weight them in order that they may be separated by centrifugal means. The gases are tangentially introduced into the base of the separation zone in tower 57 so as to effect a swirling motion which causes all droplets of the liquid to be thrown to the walls of tower 57.

In addition to introducing water through line 58 I may introduce the water through line 59 to distributor 60 which may be a simple vertical perforated pipe in the lower part of the separation zone but which is preferably a conduit 60 provided with atomizing nozzles 61 which are so directed as to augment the swirling motion of the gases and to disperse the water in extremely fine droplets. If some water is introduced into line 56 a lesser amount of water will have to be introduced through line 59. In any event, sufficient water must be introduced to effect the necessary cooling and to form a mist or fog for enveloping the catalyst particles and thus permitting the centrifugal separation thereof from the regeneration gases which are removed from the top of the separator through line 62. The walls of the scrubber may be washed with water introduced by line 59' to ring 60' which directs scrubbing water towards the walls of tower 57 for removing solids therefrom.

The water droplets together with the powdered catalyst particles form a slurry which runs down the inner sides of tower 57 through the funnel shape baffle 63 to the lower part of the tower. In the lower part of the tower sedimentation is effected, in the conical base 64 of tower 57. Most of the water is withdrawn through line 65 and cooler 66 to water storage tank 67 from which the water is withdrawn either through lines 58 or 59 as hereinabove described. Additional water will, of course, be supplied to the storage tank to compensate for any which is carried away with regeneration gases through line 62 and with the powdered catalyst slurry as will hereinafter be described.

The aqueous powdered catalyst slurry which leaves the base of tower 57 through line 68 is injected by means of pump 69 through atomizer or injector 70 to the open space in the center of vessel 54. The walls of this vessel as hereinabove described, are maintained at a temperature of about 800 to 1000° F. although temperatures as low as 600° F. may be employed. Since the walls of vessel 54 are so extremely hot the gas which is immediately adjacent said walls is highly superheated and the aqueous slurry which is injected into the vessel is therefore caused to spontaneously flash and thus become converted into steam without the possibility of coming into contact with any metal surface. By vaporizing the catalyst slurry in this manner I prevent catalyst agglomeration and thus entirely avoid the plastic or mud phase of the drying process. Each particle of the catalyst which is heretofore dispersed in water is instantaneously dispersed in steam and is carried by the steam through line 71 to line 16 where the steam serves the function of injecting further catalyst material into the transfer line from coils 14.

It should be noted that my system provides for the recovery of catalyst which is not recoverable by cyclone separators and hence would otherwise be lost with regeneration gases and it provides a method and means for dispersing this catalyst in steam without the necessity of going through a plastic stage. This steam not only serves as a carrier for the catalyst recovered in the wet centrifugal separation system but it may be used as an injector for introducing the remaining catalyst into the gas oil charging stock.

It should be noted that most of the cooling water which is employed in connection with the water centrifugal separation is continuously recycled so that any catalyst which is carried over with the water through line 66 is not lost but is returned to the centrifugal separation system so that it may be eventually recoverd. The stripped catalyst from tower 49 is withdrawn through line 72 to line 73 and is conveyed by a carrier gas introduced through line 74 to hopper 16, the carrier gas being vented through baffle 75 and line 76. If this gas vented through line 76 contains appreciable amounts of catalyst, it may be sent (by line not shown in the drawing) to line 48 for further catalyst recovery.

While I have disclosed a preferred embodiment of my invention it should be understood that I do not limit myself to this particular embodiment. Other types of flash vaporizers may be employed and in some cases this flash vaporizer may consist simply of a heat exchanger in which the catalyst slurry is forced at high velocity through tubes around which the hot regeneration gases are passed. This type of heat exchanger is not so desirable when water is used as a stripping medium because of the difficulty in removing water from an aqueous catalyst slurry without causing catalyst deposition on the tubes. I may, however, employ gas oil instead of water as a scrubbing liquid. Where gas oil is thus employed as the scrubbing liquid it is essential to prevent loss of hydrocarbons with regeneration gases which may complicate this part of my system but the gas oil catalyst mixture does not tend to produce the agglomeration or the plasticizing that is caused by the drying of aqueous solutions so that when gas oil is employed an ordinary heat exchanger may be used in place of atomizer 70 and vaporizing vessel 54.

While the invention has been described in connection with catalyst recovery from regeneration gases it may also be used for the recovery of catalyst from hydrocarbon reaction products. Where so employed, suitable means must be provided for separating the reaction products from the aqueous slurry such as settling followed by drawoff of the product layer. The aqueous slurry layer would then be subjected to flash vaporization and the suspension of the catalyst in steam will be passed to the regeneration zone instead of to the oil heating or reaction zone. Other types of water scrubbers may be used instead of the type specifically described, but the latter offers unusual efficiencies and advantages over more conventional systems. The flash vaporizer may be heated by external burners or other means. The water slurry may be injected directly into the hot vapors in the transfer line from coils 14 for generating steam in situ. Many alternatives and modifications of the apparatus and process will be evident from the above disclosure of my preferred embodiment, likewise the operating conditions may be varied within wide limits without departing from the invention.

I claim:

1. The method of separating powdered catalyst from regeneration gases which comprises passing said regeneration gases around the outside of an unobstructed vaporizing zone whereby an envelope of hot gases surrounds said vaporizing zone at a temperature of about 800° to 1000° F., passing said gases from the outside of said vaporizing zone to a centrifugal separation zone, introducing water into said hot gases in amount sufficient to reduce the temperature of said gases to at least about 212 to 210° F. and to form a vapor mist therein which weights suspended catalyst particles, centrifugally separating the vapor mist from the regeneration gases, collecting the separated mist and catalyst particles in the form of an aqueous catalyst slurry and injecting said aqueous catalyst slurry into said unobstructed vaporizing zone in such a manner and at such a rate that the water in said slurry is converted into steam while in suspension in said open vaporizing space.

2. The method of claim 1 wherein water is injected into the regeneration gases before said gases are introduced into said centrifugal separation zone.

3. The method of claim 1 wherein water is injected into the regeneration gases in the centrifugal separation zone.

4. A hydrocarbon conversion process comprising vaporizing a hydrocarbon oil and superheating said vapors to reaction temperature, contacting said superheated vapors with a powdered catalyst to effect conversion, separating catalyst from hydrocarbon material, continuously regenerating the separated catalyst by passing said catalyst through a regeneration zone, introducing an oxygen containing gas into said zone for the combustion of carbonaceous materials on the catalyst, separating about 95 to 99.9% of the regenerated catalyst from the regeneration gases by dry separation, returning the separated regenerated catalyst to the contacting step, passing the hot regeneration gases containing a small amount of powdered catalyst through a vaporizing zone and thence to a wet centrifugal separation zone, introducing a vaporizable liquid into said regeneration gases to cool said gases and to form a mist in said wet centrifugal separation zone for weighting catalyst particles therein, separating said mist and catalyst particles from regeneration gases to form a catalyst liquid slurry, passing at least a part of said liquid slurry in indirect heat exchange with hot regeneration gases in said vaporizing zone to effect vaporization of said liquid and cause suspension of catalyst in the resulting vapors, and returning said resulting vapors together with said suspended catalyst to said contacting step.

5. The method of claim 4 wherein the liquid is water and wherein the vaporized water together with suspended catalyst is returned to the contacting step.

6. The method of claim 4 wherein the liquid is gas oil and wherein the vaporized gas oil together with suspended catalyst material are returned to said contacting step.

7. A hydrocarbon conversion process which comprises contacting hydrocarbon vapors at reaction temperature with a suspended powdered catalyst to effect catalytic conversion of said vapors, continuously separating powdered catalyst from hydrocarbon vapors and reaction products, regenerating the separated catalyst by passing said catalyst through a regeneration zone in contact with an oxygen-containing gas, separating about 95 to 99.9% of the regenerated catalyst from regeneration gases, returning the separated regenerated catalyst to the contacting step, passing the regeneration gases containing a small amount of the powdered catalyst through a heat exchange zone and thence to a wet centrifugal separation zone, introducing a vaporizable liquid into said regeneration gases after they have left the heat exchange zone for cooling said gases and forming a mist in said wet centrifugal separation zone, weighting catalyst particles with said mist and centrifugally separating said weighted catalyst particles from regeneration gases to form a catalyst suspension, passing at least a part of said catalyst suspension through said heat exchange zone and returning suspended catalyt from said heat exchange zone to said contacting step.

ARTHUR L. CONN.